United States Patent
Kijima et al.

(10) Patent No.: US 10,537,094 B2
(45) Date of Patent: Jan. 21, 2020

(54) MULTI-TUBE NOZZLE FOR USE IN ERADICATING HARMFUL AQUATIC ORGANISMS

(71) Applicants: KOWA KOGYO CO., LTD., Ishinomaki-shi, Miyagi (JP); AQUA IMPULSE CORPORATION, Ishinomaki-shi, Miyagi (JP); TOHOKU UNIVERSITY, Sendai-shi, Miyagi (JP)

(72) Inventors: Akihiro Kijima, Sendai (JP); Yasuaki Kohama, Sendai (JP); Minoru Ikeda, Sendai (JP); Yoshihisa Kurita, Sendai (JP); Ikuo Chiba, Ishinomaki (JP); Tetsuya Kanno, Ishinomaki (JP)

(73) Assignees: KOWA KOGYO CO., LTD., Miyagi (JP); AQUA IMPULSE CORPORATION, Miyagi (JP); TOHOKU UNIVERSITY, Miyagi (JP)

(*) Notice: Subject to any disclaimer, the term of this patent is extended or adjusted under 35 U.S.C. 154(b) by 0 days.

(21) Appl. No.: 16/329,307

(22) PCT Filed: Aug. 24, 2017

(86) PCT No.: PCT/JP2017/030262
§ 371 (c)(1),
(2) Date: Feb. 28, 2019

(87) PCT Pub. No.: WO2018/043269
PCT Pub. Date: Mar. 8, 2018

(65) Prior Publication Data
US 2019/0216060 A1    Jul. 18, 2019

(30) Foreign Application Priority Data

Sep. 1, 2016  (JP) .................................. 2016-171239
Apr. 10, 2017 (JP) .................................. 2017-077540

(51) Int. Cl.
*A01K 63/04*     (2006.01)
*A01K 61/50*     (2017.01)
(Continued)

(52) U.S. Cl.
CPC ............ *A01K 63/042* (2013.01); *A01K 61/50* (2017.01); *A01K 63/006* (2013.01); *A01K 63/04* (2013.01);
(Continued)

(58) Field of Classification Search
CPC ...... A01K 63/042; A01K 63/04; A01K 61/50; A01K 63/006; C02F 1/34; C02F 1/4674;
(Continued)

(56) References Cited

U.S. PATENT DOCUMENTS

2012/0318751 A1     12/2012  Kijima et al.
2013/0327720 A1*    12/2013  McGuire ................... C02F 1/36
                                                             210/748.03
2016/0113249 A1*    4/2016   Kuo ....................... A01K 63/04
                                                             210/167.26

FOREIGN PATENT DOCUMENTS

EP          0225237 A1    6/1987
JP        2003-200156 A   7/2003
(Continued)

OTHER PUBLICATIONS

International Search Report dated Nov. 28, 2017 from the corresponding International Application No. PCT/JP2017/032132 an English translation.
(Continued)

*Primary Examiner* — Fred Prince
(74) *Attorney, Agent, or Firm* — Lucas & Mercanti, LLP

(57) ABSTRACT

Provided is a multi-tube nozzle for use in eradicating harmful aquatic organisms, which physically kills harmful aquatic organisms while feeding water and thus allows
(Continued)

intake water to be fed directly into a culture tank or a ballast tank without the need for a pretreatment tank, chemicals, neutralizers, etc. A multi-tube nozzle (A) for use in eradicating harmful aquatic organisms includes at least three nozzle tubes (1) that are provided adjacent to each other. The nozzle tubes (1) each includes: an inlet-side opening section (2) having an inner diameter that decreases from an inlet opening toward a throat section (3) located in the middle of the tube; an outlet-side opening section (4) having an inner diameter that increases from the throat section (3) toward an outlet opening; and the throat section (3) having a smallest inner diameter. The adjacent nozzle tubes (1) are spaced apart by a distance such that the adjacent inlet-side opening sections (2) overlap each other. A wall (5) of an overlapping portion (6) of the inlet-side opening sections (2) is cut in a U shape. An uncut portion (5a) between the adjacent U-shaped cut portions (5b) forms a sword-like pointed tip.

3 Claims, 13 Drawing Sheets

(51) Int. Cl.
| | | |
|---|---|---|
| C02F 1/34 | (2006.01) |
| C02F 1/76 | (2006.01) |
| B63J 4/00 | (2006.01) |
| C02F 1/28 | (2006.01) |
| C02F 1/46 | (2006.01) |
| A01K 63/00 | (2017.01) |
| C02F 103/08 | (2006.01) |
| C02F 103/00 | (2006.01) |
| C02F 1/467 | (2006.01) |

(52) U.S. Cl.
CPC .................. *C02F 1/34* (2013.01); *B63J 4/002* (2013.01); *C02F 1/283* (2013.01); *C02F 1/4674* (2013.01); *C02F 1/76* (2013.01); *C02F 2103/008* (2013.01); *C02F 2103/08* (2013.01); *C02F 2303/04* (2013.01)

(58) Field of Classification Search
CPC ............... C02F 2103/008; C02F 1/283; C02F 2103/08; C02F 2303/04; C02F 1/76; B63J 4/002
USPC ................ 210/167.01, 167.21; 119/226, 259
See application file for complete search history.

(56) References Cited

FOREIGN PATENT DOCUMENTS

JP        2009066532 A      4/2009
JP        2011-130685 A     7/2011

OTHER PUBLICATIONS

EPO, Extended European Search Report for the corresponding European Patent Application No. 17846274.3, dated Jul. 25, 2019 (7 pages).

* cited by examiner (a)

(b)

MULTI-TUBE NOZZLE FOR USE IN ERADICATING HARMFUL AQUATIC ORGANISMS

CROSS REFERENCE TO RELATED APPLICATION

This Application is a 371 of PCT/JP2017/030262 filed on Aug. 24, 2017 which in turn, claimed the priority of Japanese Patent Applications No. 2016-171239 filed on Sep. 1, 2016 and No. 2017-077540 filed on Apr. 10, 2017, all applications are incorporated herein by reference.

TECHNICAL FIELD

The present invention relates to a multi-tube nozzle used in "flow-through" aquaculture facilities and ballast water treatment facilities. More specifically, the present invention relates to a multi-tube nozzle for efficiently eradicating harmful aquatic organisms in the process of rearing larvae (newly hatched earliest form) of artificially produced seedlings of invertebrates such as shellfish and sea cucumbers (aquaculture species) until they grow to a size suitable for eating, particularly because the larvae are susceptible to feeding damage from such harmful aquatic organisms, or to a multi-tube nozzle for efficiently damaging or killing aquatic organisms contained in ballast water of ships.

BACKGROUND ART

With the recent globalization and the resulting income growth in developing countries as well as the worldwide increase in health consciousness and the resulting change in eating habits, the demand for marine products has been significantly increasing. In order to meet this demand, maritime countries have used the provisions of various treaties to ensure their exclusive access to marine products. In addition, due to overfishing by pelagic fisheries in international waters, supply of migratory fish has been steadily decreasing. Under these circumstances, not only our country but also other countries are encouraging artificial production of seedlings and various types of aquaculture of a variety of marine products.

A wide variety of marine species can be applied to aquaculture. For example, in the case of eels, juvenile eels to be cultured are collected in the spawning area of the sea and then reared until they grow to adults. In the case of tuna and red sea bream, their hatched larvae produced by fertilization are reared until they grow to adults (full cycle aquaculture system). Furthermore, in the case of marine invertebrates such as sea cucumbers, sea urchins, and shellfish (including oysters, abalones, and scallops), their larvae produced by fertilization are reared until they grow to a size large enough to be released, and then released and let them grow on their own (culture and release of artificially produced seedlings (for marine stock enhancement)).

In the case of fish, larvae hatched from fertilized eggs are much bigger than those of shellfish and thus not susceptible to feeding damage from harmful aquatic organisms. However, as described above, larvae of shellfish are susceptible to feeding damage from harmful aquatic organisms with a total length of 100 μm or less, for example. Needless to say, not only marine invertebrates as mentioned above but also brackish water or fresh water invertebrates can be applied to aquaculture.

There are various aquaculture systems. Examples of the systems include: "marine cage aquaculture" in which a net is fitted across a marine cage and juveniles are placed into the cage and cultured; and "land-based aquaculture" in which land-based tanks are placed and fish and shellfish are reared in the tanks.

Land-based aquaculture (aquaculture of fish) includes "closed recirculating aquaculture system (Patent Literature 1)" in which culture water used for aquaculture is recycled by discharging the water from a culture tank and removing or decomposing feeds and organic excrement of a fish species to be cultured, such as feces and ammonia, contained in the culture water by various mechanisms for circulation and recycling; and "flow-through aquaculture system (FIGS. 17 and 18)" in which seawater is pumped up using a water intake pump, aquatic organisms harmful to a fish species to be cultured are previously subjected to chemical treatment in a pretreatment tank, the treated water is fed to the culture tank, and water in an amount equal to the amount of the treated water thus fed is discharged from the culture tank to the sea (or a river). The most suitable aquaculture system is adopted in view of costs, work environments, and fish species to be cultured.

In the case of "flow-through aquaculture system", a water pumping pump P1 is activated to pump water R from the sea (or a river), the pumped water R is roughly filtered through a primary filter 41 and filtered through a secondary filter 21 to remove fine contaminants, and then fed to a culture tank 10. This filtered water R contains harmful aquatic organisms 9 (such as copepods (i.e., a typical type of planktonic animals which are found throughout the year, particularly aquatic copepod crustaceans)) which may cause various problems. For example, such harmful aquatic organisms 9 may prey on or eat up larvae, or may consume feed given to juveniles metamorphosed from larvae by aquaculture producers to rear the juveniles and thus cause a problem of "feeding competition". Therefore, the pumped seawater R must be treated to eradicate these organisms as much as possible before feeding the water R to the culture tank 10.

(It should be noted that if the species to be cultured grow to juveniles having resistance to the harmful aquatic organisms 9, they are not exposed to predatory feeding damage from the harmful aquatic organisms 9 such as copepods, but the above-mentioned "feeding competition" problem still remains unsolved.)

However, in the seawater R, the harmful aquatic organisms 9 are present not only in the form of adults but also in the form of cysts (eggs of approximately 10 μm or more). If the culture tank 10 is contaminated with these cysts, they hatch in the culture tank 10, grow vigorously in a short period of time, and cause the above-mentioned problems. In addition, ultraviolet sterilizers, ozone, etc. are not effective against such cysts. Filtration through a high-efficiency filter is the only method to solve these problems, but the use of this method is practically difficult because the filter mesh is too fine and becomes clogged in a short time.

Thus, the processes as shown in FIG. 18 are performed: a pretreatment tank 15 with a size comparable to that of the culture tank 10 is additionally prepared and a large amount of disinfectant chemical is put into the tank 15 so as to previously kill harmful aquatic organisms with high probability; then a neutralizer is added to sufficiently neutralize the disinfectant chemical; and finally the treated seawater R is drawn from the pretreatment tank 15 using a transfer pump P2 so as to feed the water R to the culture tank 10 through a transfer pipe 35.

In the existing "flow-through aquaculture" facilities configured as described above, the facility cost is much lower than that in the traditional "closed recirculating aquaculture"

facilities. However, the "flow-through aquaculture" for marine invertebrates requires a large pretreatment tank 15, a large amount of disinfectant chemical and neutralizer, and constant monitoring and control of harmful aquatic organisms, and thus is the most effort-, time-, and cost-consuming system.

In addition, due to concerns about residual chemicals, there has been a demand for treatment without chemicals.

The same holds true for the above-mentioned ballast water. These days, due to globalization and the resulting rapid expansion of trading and global operation of large ships, increasing attention has been paid to a problem in which a huge amount of ballast water (water charged into a ship and discharged therefrom at each port of call to keep the unloaded ship steady) is transferred around the world and destroys the gulf ecosystems of the ports of call. Therefore, the International Convention for the Control and Management of Ships' Ballast Water and Sediments was adopted. Under the Convention, all ships are required to comply with the ballast water treatment standards (water quality not containing high levels of residual chemicals) according to the capacity of ballast water of each ship.

Under these circumstances, a device with slit openings as shown in Patent Literature 2 has been suggested as a device for use in eradicating aquatic organisms contained in seawater. In this device, however, when the seawater passes through the slit openings, a vortex is formed in front of each slit plate and a significant pressure drop occurs. Despite such a significant pressure drop, many of the aquatic organisms pass through the slit openings, which means that these organisms cannot be eradicated with high efficiency. In addition, the spacing between the slit openings cannot be reduced because the smaller spacing between the slit openings reduces the strength of the narrower portion therebetween, and thus the resulting device has a large size. The use of conventional venturi tubes also has the same problem.

CITATION LIST

Patent Literature

[PTL 1] Japanese Laid-Open Patent Publication No. 2011-130685
[PTL 2] Japanese Laid-Open Patent Publication No. 2003-200156

SUMMARY OF INVENTION

Technical Problem

The object of the multi-tube nozzle for use in eradicating harmful aquatic organisms according to the present invention is to solve the problem of the conventional "flow-through aquaculture system" for the species to be cultured including marine and aquatic (such as seawater, river water, brackish water, etc.) invertebrates such as shellfish and sea cucumbers and the problem of "ballast water". More specifically, the object of the present invention is to achieve an innovative multi-tube nozzle for use in eradicating harmful aquatic organisms, which treats a large amount of water passing through the nozzle tubes in a short time with the lowest pressure drop, physically kills or damages harmful aquatic organisms contained in the water with high probability while feeding the water (without the need for a large pretreatment tank, a large amount of chemical and neutralizer, etc.), and thus allows intake water (such as seawater, river water, brackish water, etc.) to be fed directly into a culture tank.

Solution to Problem

The invention according to claim 1 relates to a "multi-tube nozzle A for use in eradicating harmful aquatic organisms" (FIG. 4 and FIG. 6 to FIG. 10) including at least three nozzle tubes 1 that are provided adjacent to each other, the nozzle tubes 1 each including: an inlet-side opening section 2 having an inner diameter that decreases from an inlet opening toward a throat section 3 located in the middle of the tube; an outlet-side opening section 4 having an inner diameter that increases from the throat section 3 toward an outlet opening; and the throat section 3 having a smallest inner diameter, wherein the adjacent nozzle tubes 1 are spaced apart by a distance such that the adjacent inlet-side opening sections 2 overlap each other, a wall 5 of an overlapping portion 6 of the inlet-side opening sections 2 is cut in a U shape, and an uncut portion 5a between the adjacent U-shaped cut portions 5b forms a sword-like pointed tip.

The invention according to claim 2 relates to another "multi-tube nozzle A for use in eradicating harmful aquatic organisms" (FIG. 5), including at least three nozzle tubes 1 that are provided adjacent to each other, the nozzle tubes 1 each including: an inlet-side opening section 2 having an inner diameter that decreases from an inlet opening toward a throat section 3; and the throat section 3 having an outlet-side end 4b that serves as an outlet opening, wherein the adjacent nozzle tubes 1 are spaced apart by a distance such that the adjacent inlet-side opening sections 2 overlap each other, a wall 5 of an overlapping portion 6 of the inlet-side opening sections 2 is cut in a U shape, and an uncut portion 5a between the adjacent U-shaped cut portions 5b forms a sword-like pointed tip.

In the inventions according to claims 1 and 2, the harmful aquatic organisms 9 in the water R is physically killed with high efficiency when the water R flows through the nozzle tubes 1, and the water R containing a significantly reduced number of harmful aquatic organisms 9 can be fed into the culture tank 10.

Since the multi-tube nozzle A has at least three nozzle tubes 1 that are provided adjacent to each other, the diameter of the throat section 3 of each of the nozzle tubes 1 can be reduced by a factor of the number of nozzle tubes, compared to a conventional nozzle having only one nozzle tube 1 with a larger inner diameter throat section 3. As a result, with the narrower nozzle tube 1 (that is, the narrower throat section 3), minute harmful aquatic organisms 9 can be eradicated effectively. In other words, minute harmful aquatic organisms 9 are more likely to pass through the conventional nozzle tube 1 with a larger inner diameter throat section 3, and thus the eradication effect is less likely to be achieved.

In the inventions according to claims 1 and 2, the diameter of the nozzle tube 1, particularly the inner diameter of the throat section 3, can be suitably selected depending on minute harmful aquatic organisms 9. In addition, the number of nozzle tubes 1 to be provided in one multi-tube nozzle A or the number of multi-tube nozzles A to be provided in the flow path can be changed depending on the flow rate of the water to be treated.

It should be noted that since the nozzle having the above-mentioned shape (in particular, a sword-like pointed tip of the uncut portion 5a) allows a large amount of water to pass smoothly through the nozzle tube 1 (particularly to flow into the nozzle tube 1) with less pressure drop, it can be used in various sizes of facilities including large aquaculture facilities and laboratory-scale facilities.

In addition, since the adjacent nozzle tubes 1 are spaced apart by a distance such that the adjacent inlet-side opening sections 2 overlap each other, the nozzle tubes 1 can be provided closely to each other, and thus the diameter of the multi-tube nozzle A can be reduced. In other words, the distance between the nozzle tubes 1 can be minimized, and thus the size of the device can be reduced significantly. The overlapping portion is a common area of two overlapping circles 2a each forming the inlet opening edge (in other words, an intersection of the overlapping circles 2a), as shown as a gray region in FIGS. 11 to 13.

Furthermore, the walls 5 of the overlapping portion 6 of the adjacent nozzle tubes 1 are each cut in a U shape, and the uncut portion 5a between the adjacent U-shaped cut portions 5b forms a sword-like pointed tip. Therefore, this sword-like pointed tip of the uncut portion 5a allows the incoming water R to be divided into separate streams, which are respectively guided toward the inlet-side opening sections 2 of the nozzle tubes 1 and flow into the inlet-side opening sections 2 smoothly without forming vortices U in this region.

In other words, if the adjacent nozzle tubes 100 are spaced apart by a distance such that the adjacent inlet-side opening sections 200 do not overlap each other, as shown in FIGS. 19(a) and (b), a flat portion 200h is formed on the inlet-side surface 200b between the adjacent inlet-side opening sections 200. Then, this flat portion forms vortices U (turbulence), which block the flow of the water R into the inlet-side opening sections 2 and reduce the flow rate, that is, increase the pressure drop. As a result, the flow rate of the discharge water flow 400a leaving the outlet-side opening sections 400 decreases significantly, the amount of nano-bubbles 8 formed in the discharge water flow 400a decreases, and eventually the eradication rate of the harmful aquatic organisms 9 decreases significantly.

The invention according to claim 3 is the multi-tube nozzle A for use in eradicating harmful aquatic organisms according to claim 1 or 2, wherein the throat section 3 has an inner diameter of 3 mm or less (preferably 0.5 to 3 mm, and more preferably 1 to 3 mm).

The strongest harmful aquatic organisms 9 like larvae of bivalves among the organisms to be eradicated have a size of about 100 to 200 μm. Therefore, the throat section 3 having an inner diameter of 3 mm or less allows these aquatic organisms to be captured within a long and narrow high-speed discharge water flow 4a extending in the water R discharged from the outlet-side opening section 4, and implosion of nano-bubbles 8 formed in this high-speed discharge water flow 4a generates shock waves, which kill or fatally damage the aquatic organisms with high probability (FIGS. 14 and 15). It should be noted that the killing rate and damage rate mentioned above increase as the inner diameter of the throat section 3 decreases.

The multi-tube nozzle A of the present invention can be applied to various facilities including an aquaculture facility Z and a ballast water treatment facility Z1 that require a large amount of feed water and laboratory-scale aquaculture facilities and ballast water treatment facilities not shown, and the throat section 3 having an inner diameter of 3 mm or less is used in view of the size of the harmful aquatic organisms 9. The inner diameter is in a range of 0.5 to 3 mm for practical use, and more preferably in a range of 1 to 3 mm.

Advantageous Effects of the Invention

As is clear from the above, the use of the multi-tube nozzle of the present invention has the following advantageous effects:

(1) it is possible to feed intake water (such as seawater, river water, etc.) directly to a culture tank and rear invertebrates including shellfish without the need for a large pretreatment tank, a large amount of chemicals and neutralizers, etc., which are conventionally needed; and (2) it is possible to damage or kill aquatic organisms with high efficiency and thus significantly reduce the amount of chemicals which must be used before charging and discharging ballast water into and from a ballast tank when cargo is loaded at an overseas loading port.

DESCRIPTION OF EMBODIMENTS

Hereinafter, the embodiments of the present invention will be described with reference to the diagrams. In a typical flow-through aquaculture farm, a number of culture tanks 10 are placed in parallel, and a specific amount of fresh seawater R is constantly fed to each of the culture tanks 10 while the equal amount of contaminated culture water R is discharged to keep the water quality constant for aquaculture. The aquaculture species farmed in the culture tanks 10 are classified into groups according to various aspects such as differences in type, development stage, and culture conditions, and prevention of infection of diseases, and they are cultured separately in different culture tanks 10 or for different groups. Since the water quality in the culture tanks 10 is slightly different from each other, utmost care is taken to prevent each culture tank 10 from being contaminated with the culture seawater R in other culture tanks 10 when water is fed from outside.

Figure 1:
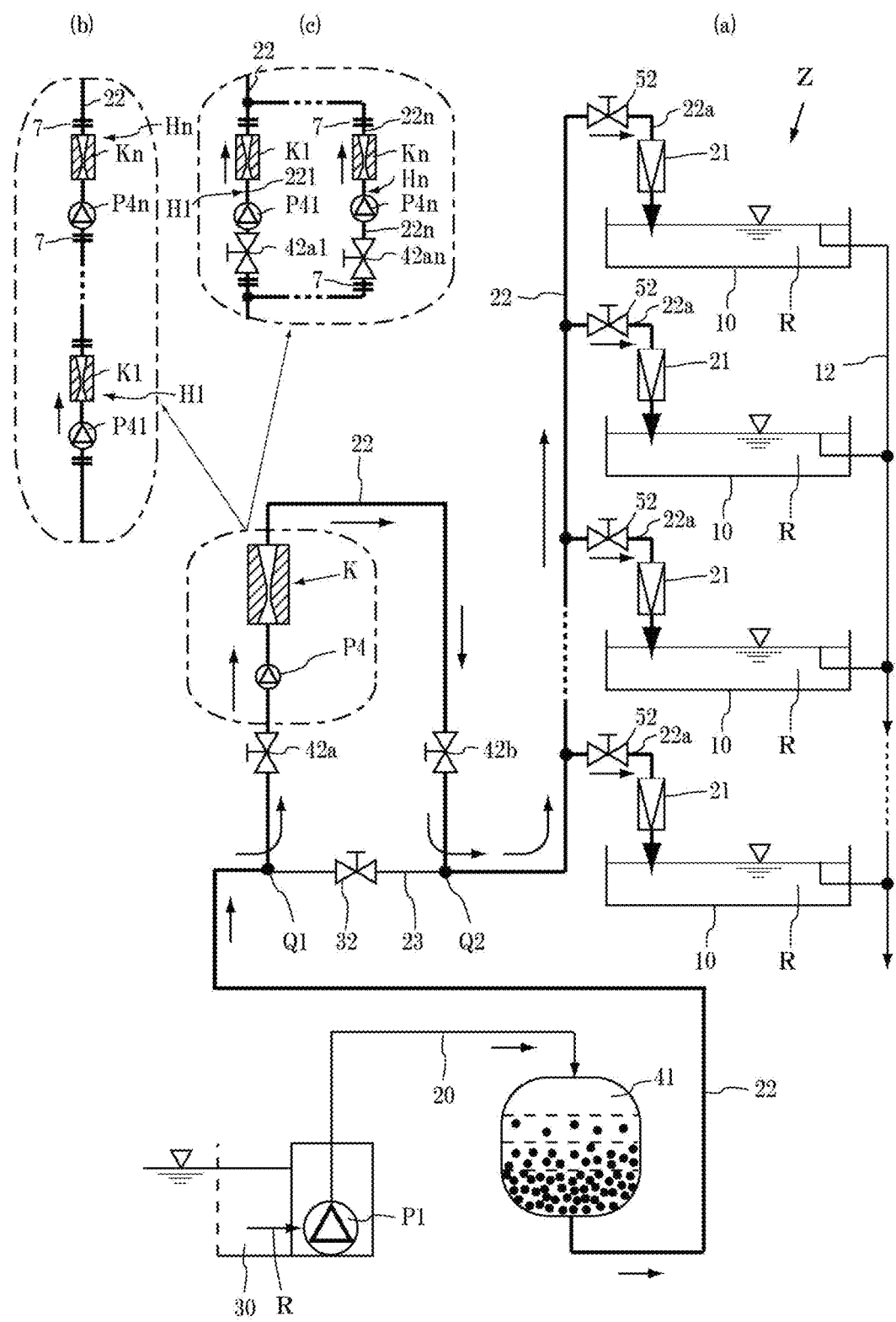
FIG. 1(a) shows an overview of a piping system of a first embodiment including a nozzle of the present invention (multi-tank feed water system), (b) shows the system including a plurality of pipe-embedded eradication units connected in series, and (c) shows the system including the plurality of units connected in parallel.
Figure 2:
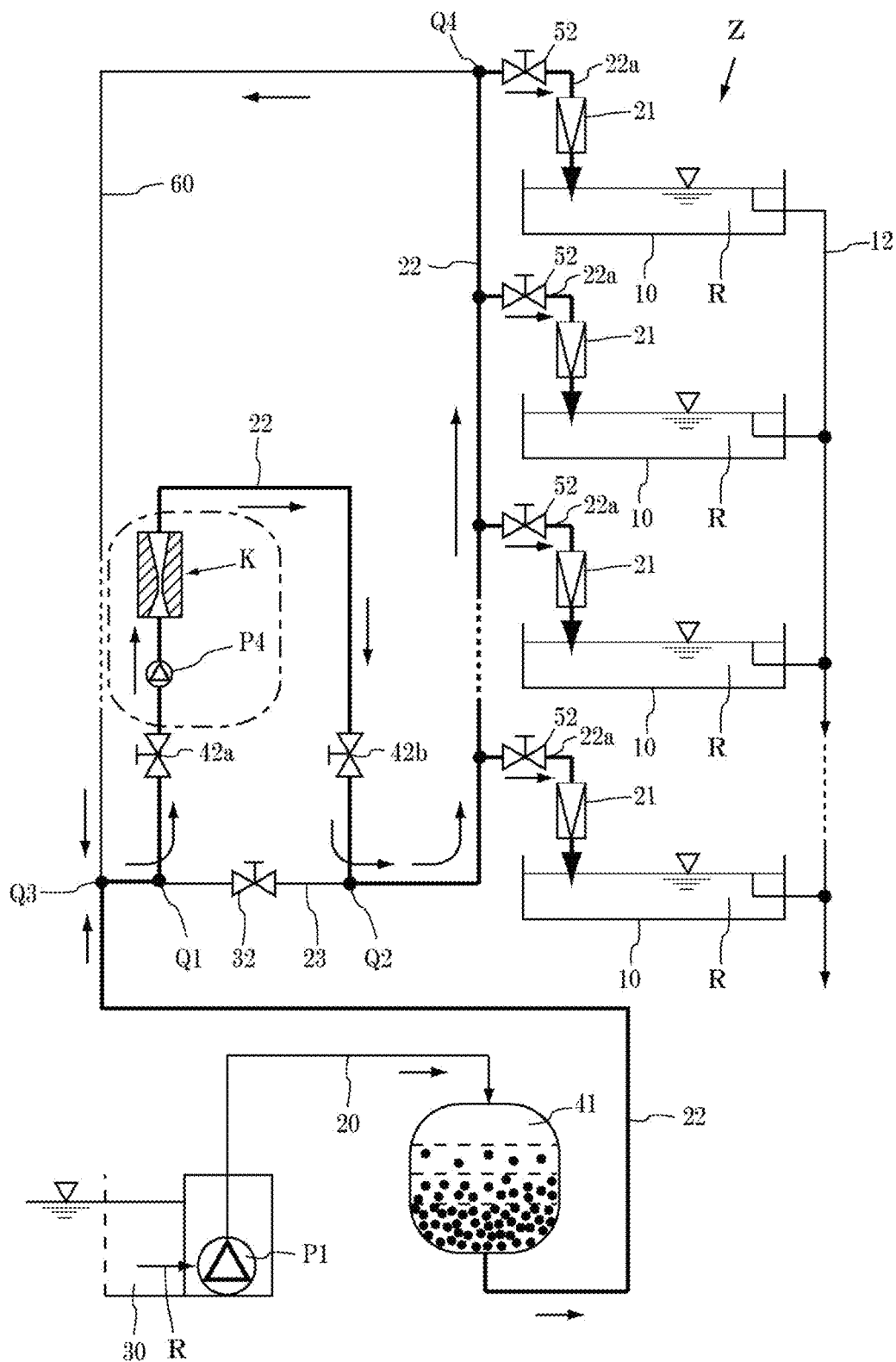
FIG. 2 shows a piping system of a second embodiment including the nozzle of the present invention (feed water circulation system).
Figure 3:
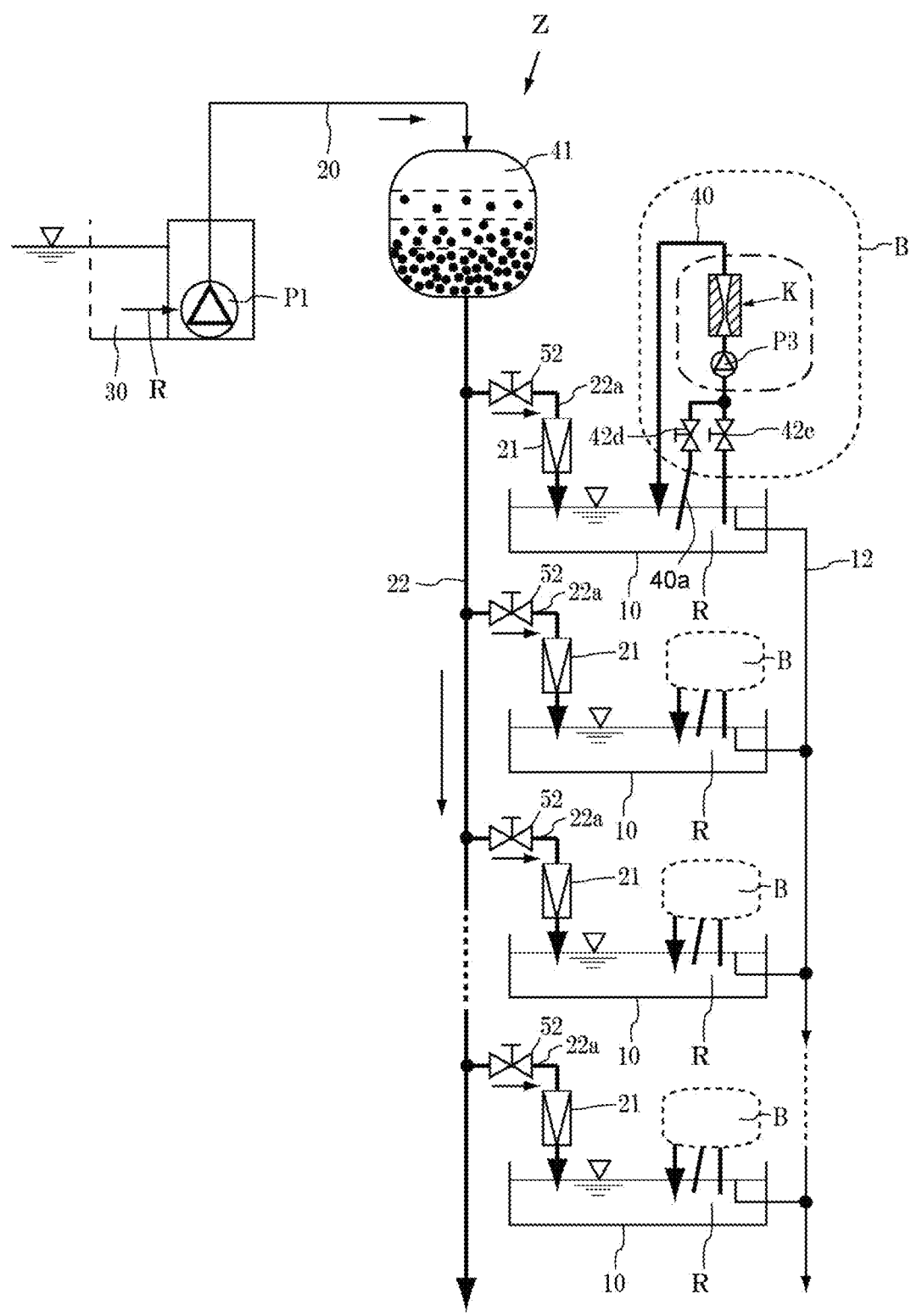
FIG. 3 shows a piping system of a third embodiment including the nozzle of the present invention (system provided with an additional eradication device).

FIGS. 1 to 3 are examples of the flow in the flow-through aquaculture farm in which a number of culture tanks 10 are placed in parallel. FIGS. 1 and 2 show a "flow-through" aquaculture facility Z in which a pipe-embedded eradiation unit K of the present invention is incorporated previously, and in particular, FIG. 2 shows a circulation-type aquaculture facility Z in which part of the seawater R in a water feed pipe 22 as a main pipe is returned to mix it with the pumped water R so as to allow the mixed water to pass through the pipe-embedded eradication unit K again.

FIG. 3 shows the case where the existing "flow-through" aquaculture facility Z is provided with an independent additional eradication device B. It is also possible to install the additional eradication device B of FIG. 3 in the facility of FIG. 1 or 2.

In the "flow-through" facility, the most suitable water R, such as seawater, river water, or brackish water, for the aquaculture species is used. Since there is no difference between the seawater R and river water or brackish water, the seawater R is described here as a typical example.

In FIG. 1(a), the aquaculture facility Z includes an intake conduit 30, a water pumping pump P1, a water pumping pipe 20, a sand filter as a primary filter 41, a water feed pipe 22, a branch pipe 22a of the water feed pipe 22, a water tank on/off valve 52, a pipe-embedded eradication unit K including one or a plurality of multi-tube nozzles A, a water feed upper on/off valve 42a, a water feed lower on/off valve 42b, a shortcut pipe 23, a circulation on/off valve 32, a secondary filter 21, one or a plurality of culture tanks 10, and a water discharge section 12.

One pipe-embedded eradication unit K may be placed, or a plurality of pipe-embedded eradication units K1 to Kn may be connected in series as shown in FIG. 1(b) or in parallel as shown in FIG. 1(c). Hereinafter, the case where one pipe-embedded eradication unit K is placed is described as a typical example, and the case where a plurality of pipe-embedded eradication units K are used will be described later.

Since the seawater R may contain contaminants such as large and small debris, aquatic organisms like jellyfish and small fish, and seaweed, it cannot be taken directly into the aquaculture facility Z. The intake conduit 30 is a structure that is installed in the sea (or river) and allows these contaminants to settle or float so as to remove them and supply only the seawater R to the water pumping pump P1. At this stage, the seawater R contains various types of large and small harmful aquatic organisms 9.

The water pumping pump P1 is placed adjacent to the intake conduit 30, and the water pumping pipe 20 is withdrawn from the water pumping pump P1 and connected to the sand filter as the primary filter 41. In the sand filter as the primary filter 41, a support layer is provided on the bottom, as well known, and filtration layers of various filter materials are provided on the support layer. This filter can filter out small contaminants contained in the pumped water R, but cannot filter out the harmful aquatic organisms 9 and cysts. The water feed pipe 22 is withdrawn from the bottom of the primary filter 41.

The water feed pipe 22 withdrawn from the bottom of the primary filter 41 is laid along the culture tanks 10, and the branch pipes 22a of the water feed pipe 22 are connected to respective culture tanks 10. The branch pipes 22a each have a water tank on/off valve 52, and a secondary filter 21 is provided downstream of the on/off valve 52.

The secondary filter 21 filters out fine debris, fragments of the harmful aquatic organisms 9 which are physically broken in the pipe-embedded eradication unit K to be described later, portions of the surviving harmful aquatic organisms 9, a certain size of cysts, etc., and prevents these filtered fragments, etc. from flowing into the culture tank 10. Glass fiber filter paper, cellulose-containing glass fiber filter paper, a filter bag made of resin such as polypropylene, etc. are commonly used.

In the water feed pipe 22, a water feed upper on/off valve 42a, a water feed pump P4, a pipe-embedded eradication unit K including a multi-tube nozzle A, and a water feed lower on/off valve 42b are arranged in this order from the upstream side closer to the primary filter 41. A portion of the pipe 22 in which the pipe-embedded eradication unit K is placed is disposed vertically so as to allow the seawater R to flow upward.

A shortcut pipe 23 is connected between an inlet-side connection point Q1 located on the inlet side of the water feed upper on/off valve 42a of the water feed pipe 22 and an outlet-side connection point Q2 located on the outlet side of the water feed lower on/off valve 42b, and is provided with a circulation on/off valve 32.

The culture tank 10 may have any shape such as a ship, barrel, or box shape with an opening on its top, and may be made of any material such as FRP. The culture tank 10 used in the present invention is intended to rear larvae of marine invertebrates (such as sea cucumbers, sea urchins, and shellfish (including oysters, abalones, and scallops) mainly produced by fertilization until they grow to a size large enough to be released. The culture tank 10 is provided with the branch pipe 22a of the water feed pipe 22 and the water discharge section 12.

Figure 6:
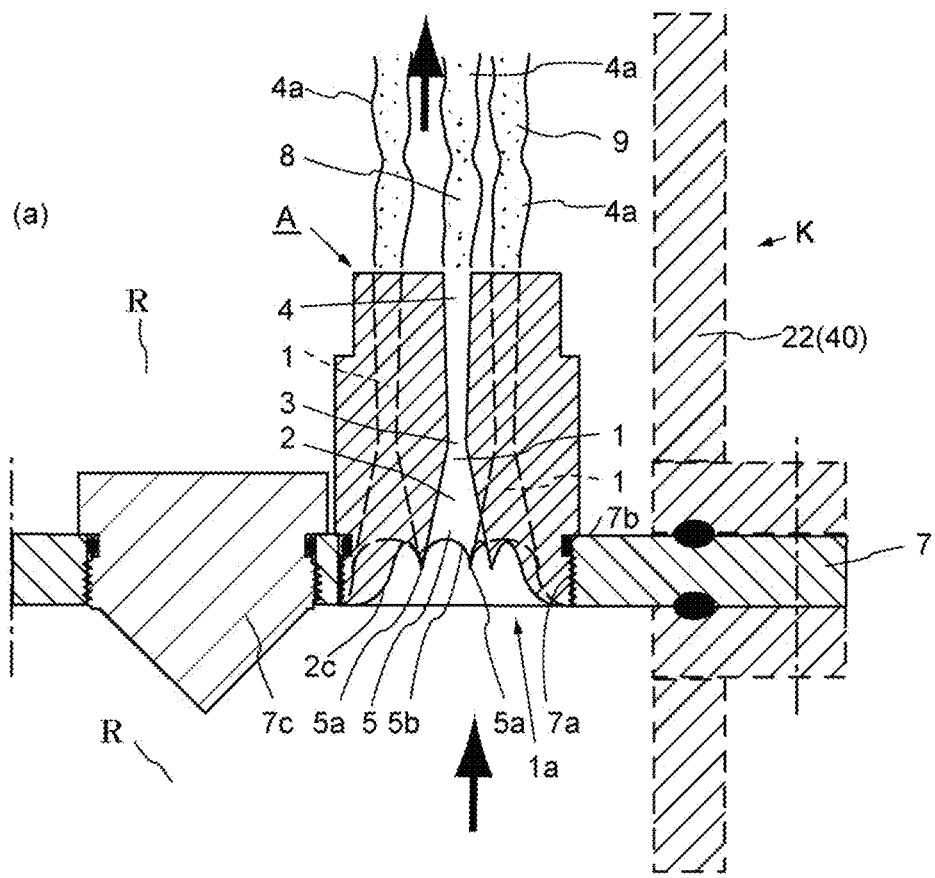
FIG. 6(a) is a longitudinal cross-sectional view of a main part of a pipe-embedded eradication unit including the nozzles of the present invention, and (b) is a view of the inlet side of the unit.
Figure 6:
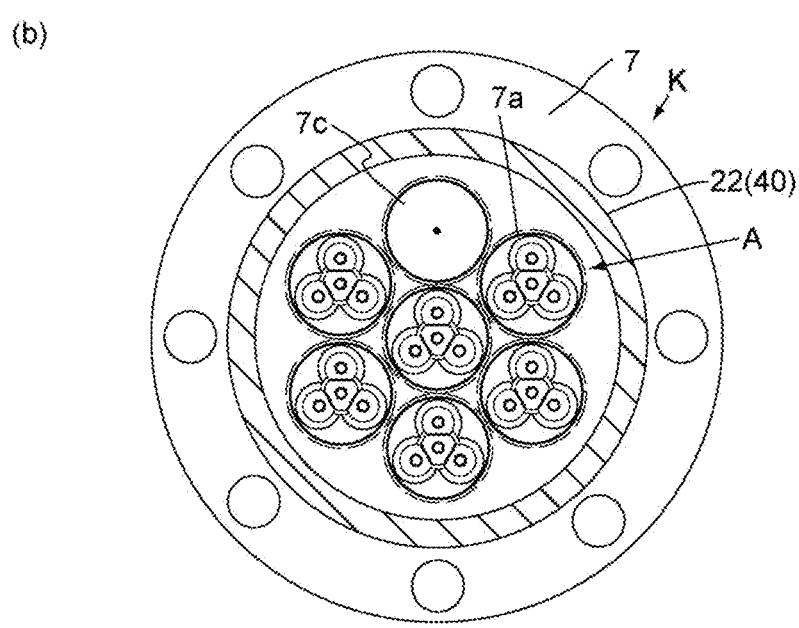

A multi-tube nozzle A is used as a main device of the pipe-embedded eradication unit K, and one or a plurality of multi-tube nozzles A are mounted through a flange plate 7 depending on the flow rate (FIG. 6). As shown in FIG. 6(b), an example of the flange plate 7 includes one mounting hole 7a formed at the center of the plate and six mounting holes 7a formed around it. The number of the mounting holes 7a is not limited to this, and may be one or two or more. In the case where the number of the mounting holes 7a is three or more, they are formed so that the center-to-center distance between the adjacent ones is fixed. For example, in the case where the number of the mounting holes 7a is three, the holes are formed at the vertices of an equilateral triangle. In the case where the number of the mounting holes 7a is four, the holes are formed at the vertices of a square or the vertices of two equilateral triangles with a common edge. In the case where the number of the mounting holes 7a is seven, one hole is formed at the center of the flange plate 7 and the remaining six holes are formed around it at regular intervals (hexagonal closest-packed structure).

The flange plate 7 is located in the middle of the water feed pipe 22 (a vertically-disposed portion), and is fastened to the flange of the water feed pipe 22 with bolts passing through the through-holes formed along the periphery of the flange plate 7.

The number of the multi-tube nozzles A to be used depends on the flow rate of the seawater R, and when some of them are not used, the corresponding mounting holes 7a are closed by closing stoppers 7c. The insertion-side end of the closing stopper 7c has a conical shape and is fitted in the hole to protrude from the flange plate 7.

The flange plate 7 is mounted in the middle of the vertically upward flow in the water feed pipe 22, as described above, and the multi-tube nozzles A are mounted in the flange plate 7 with their inlet openings facing downward. An O-ring 7b is attached to the screw base of each multi-tube nozzle A to prevent leakage of water.

The multi-tube nozzle A is a cylindrical member, and a male screw for screwing the nozzle A into the mounting hole 7a of the flange plate 7 is formed on the inlet-side outer periphery of the nozzle A, as shown in FIG. 6(a). The mounting method is not limited to this, but in the case shown in FIG. 6(a), the nozzle is fixed with a screw.

The multi-tube nozzle A is a cylindrical member made of highly corrosion-resistant stainless steel or resin and having a concave hemispherical inlet-side surface (front surface) 1a, and three or more nozzle tubes 1 having a circular cross-sectional shape are formed in this concave hemispherical surface 1a to penetrate the nozzle A from the front surface toward the rear surface. All of the nozzle tubes 1 have essentially the same longitudinal cross-sectional shape.

Figure 4:
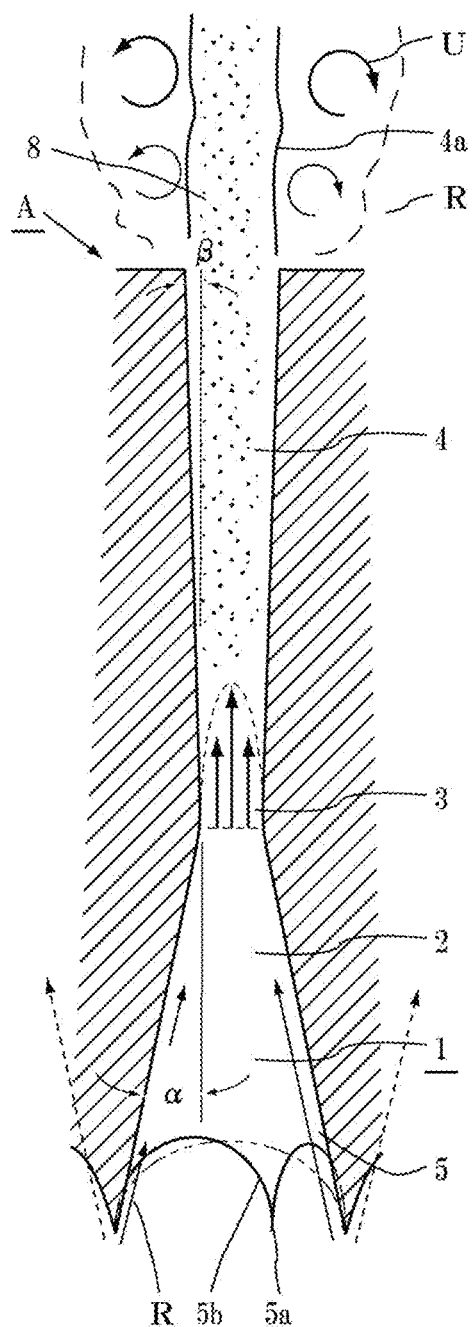
FIG. 4 is an enlarged longitudinal cross-sectional view of a multi-tube nozzle of the present invention.

A first example of the nozzle tube 1 has an internal shape (longitudinal cross-sectional shape) including an inlet-side opening section 2, a throat section 3, and an outlet-side opening section 4, as shown in FIG. 4.

The diameter of the inlet-side opening portion 2 is gradually reduced such that the cross-sectional area (the area of the inlet-side water passage) perpendicular to the central axis of the nozzle tube 1 gradually decreases from the inlet opening toward the throat section 3 located in the middle of the nozzle tube 1.

The throat section 3 is a short cylindrical tube with the smallest cross-sectional area (or a circular hole with the smallest cross-sectional area connecting the outlet of the inlet-side opening section 2 and the inlet of the outlet-side opening section 4).

The outlet-side opening section 4 is formed such that the cross-sectional area (the area of the outlet-side water passage) perpendicular to the central axis of the nozzle tube 1 gradually increases from the throat section 3 toward the outlet opening. In other words, the inlet-side opening section 2 corresponds to the section between the inlet opening and the throat section 3, and the outlet-side opening section 4 corresponds to the section between the throat section 3 and the outlet opening.

The opening angle of the inlet-side opening section 2 is greater than that of the outlet-side opening section 4.

The opening angle of the inlet-side opening section 2 is, for example, 22°±3° (the half vertex angle α is 11°±1.5°) to minimize the loss caused by the reduced diameter of the nozzle.

The opening angle of the outlet-side opening section 4 is, for example, 7.4°±2° (the half vertex angle β is 3.7°±1°), more preferably 7.4°±1° (the half vertex angle β is 3.7°±0.5°), to minimize the loss caused by the increased diameter of the nozzle.

An inlet section 2c of the inlet-side opening section 2 connecting the concave hemispherical surface 1a and the inner peripheral surface of the inlet-side opening section 2 would form an angle along the connecting line therebetween because the curvatures and directions of curvature of these curved surfaces are different from each other if nothing is done, and this angle would cause formation of a vortex on the connecting line. Therefore, in order to achieve smooth flow of the seawater R into the inlet opening without forming vortices U in this region, the connecting section 2c between these curved surfaces in the non-overlapping portion (a non-common area of overlapping circles 2a each forming the inlet opening edge) forms a gently convex surface (FIG. 6(a)). This means that, in this connecting portion 2c, a cross section parallel to the central axis of the nozzle tube 1 forms a circular arc convex inwardly toward the axis of the nozzle tube 1. The inner surface portion from the inlet section 2c toward the throat section 3 forms a straight line. Likewise, the inner surface portion of the outlet-side opening section 4 toward the outlet opening also forms a straight line.

The connecting section between the inlet-side opening section 2 and the throat section 3, and the connecting section between the throat section 3 and the outlet-side opening section 4 are also smoothly rounded curved surfaces, and the entire inner surface of the nozzle tube 1 is a smoothly rounded curved surface from the concave hemispherical surface 1a to the outlet opening of the outlet-side opening section 4.

The inner diameter of the throat section 3 is determined according to the strongest aquatic organisms among the organisms to be eradicated (for example, larvae of bivalves having bodies enclosed by a shell consisting of two laterally hinged parts), and it is typically 3 mm or less. The smaller the inner diameter of the throat section 3 the better, because the killing rate and the damage rate increase as the inner diameter becomes smaller.

It is not necessarily appropriate to determine the lower limit of the inner diameter of the throat section 3 because it depends on the size and strength of the object to be eradicated, the amount of water to be fed, and the differential pressure, and it is practical to select 0.5 mm. In general, the inner diameter is preferably 1 mm to 3 mm, more preferably 2 mm±0.5 mm, in view of the killing rate, the damage rate, and the differential pressure.

Next, the arrangement of the nozzle tubes 1 and the number of the nozzle tubes 1 in the multi-tube nozzle A are described. Since one to N (usually a plurality of) multi-tube nozzles A are mounted in the mounting holes 7a formed in the flange plate 7 depending on the flow rate of the seawater R, as described above, their outer diameter and length are not very large.

Figure 11:
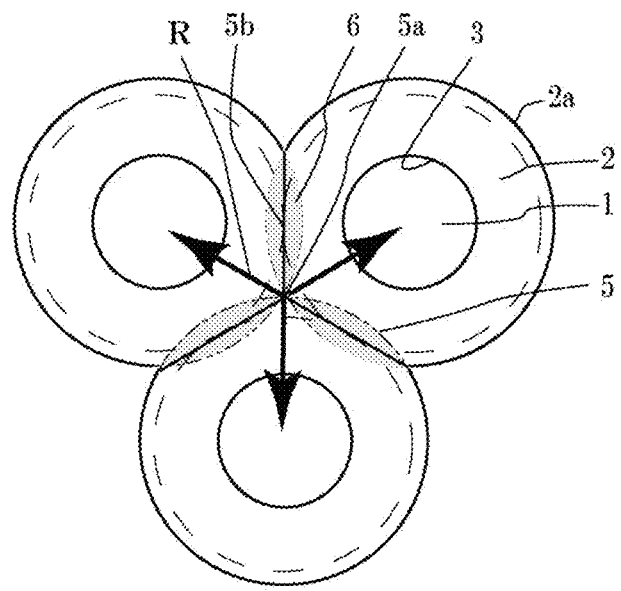
FIG. 11 is a front view of a main part of a three-tube nozzle.

Examples of the arrangement of the nozzle tubes 1 are as follows. Three or more nozzle tubes 1 are formed through the nozzle from the circular front surface 1a toward the rear surface. The nozzle tubes 1 thus formed have the same shape. In the case of the multi-tube nozzle A including three or more nozzle tubes 1, these three nozzle tubes 1 are formed in such a manner that the centers of the nozzle tubes 1 are respectively located at the vertices of an equilateral triangle formed at the center of the front surface 1a of the multi-tube nozzle A (FIG. 11).

Figure 7:
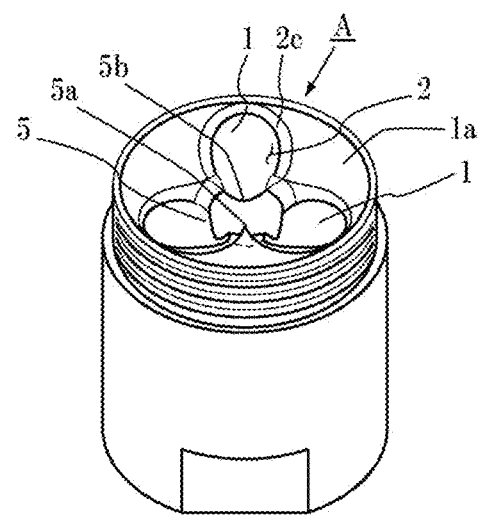
FIG. 7 is a perspective view of the inlet side of a four-tube nozzle of the present invention.
Figure 8:
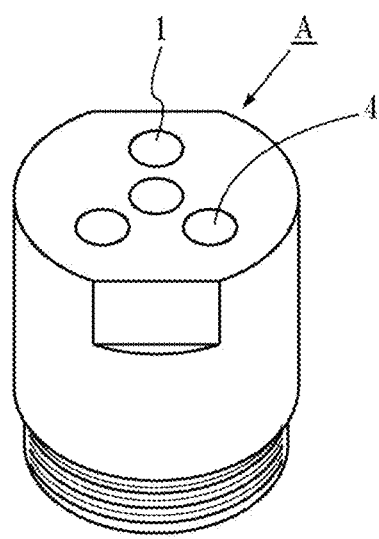
FIG. 8 is a perspective view of the rear side of the nozzle shown in FIG. 7.
Figure 9:
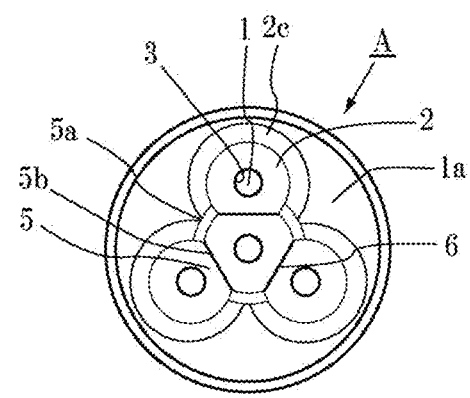
FIG. 9 is a front view of the inlet side of the nozzle shown in FIG. 7.
Figure 12:
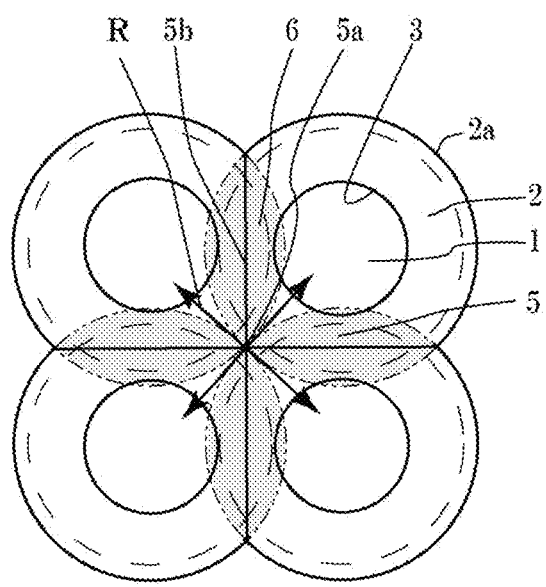
FIG. 12 is a front view of a main part of a four-tube nozzle.
Figure 13:
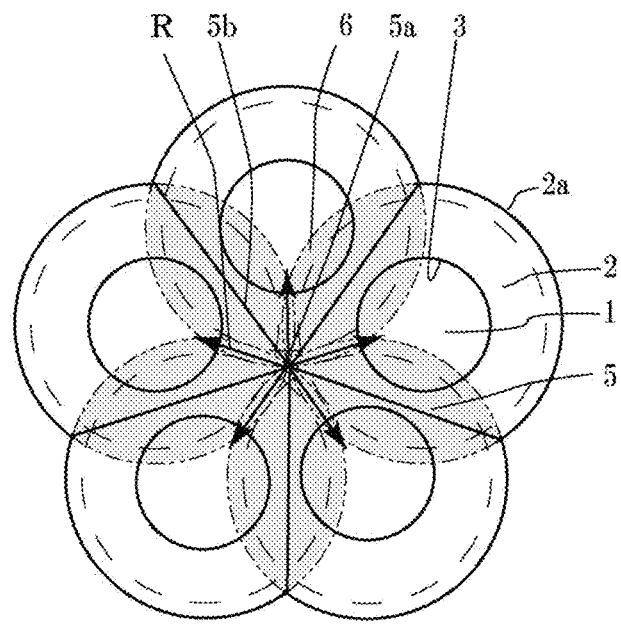
FIG. 13 is a front view of a main part of a five-tube nozzle.

In the case of four nozzle tubes 1, these four nozzle tubes 1 are formed in such a manner that the centers of the tubes 1 are respectively located at the vertices of a square, as shown in FIG. 12, or that one nozzle tube 1 is formed at the center of the front surface 1a and the other three nozzle tubes 1 are formed at regular angular intervals of 120° around the one center tube 1, as shown in FIGS. 7 to 9. In the case of five nozzle tubes 1, these five nozzle tubes 1 are formed in such a manner that the centers of the tubes 1 are respectively located at the vertices of a pentagon, as shown in FIG. 13. In any of these cases, the center-to-center distance between the adjacent nozzle tubes 1 is equal.

Figure 10:
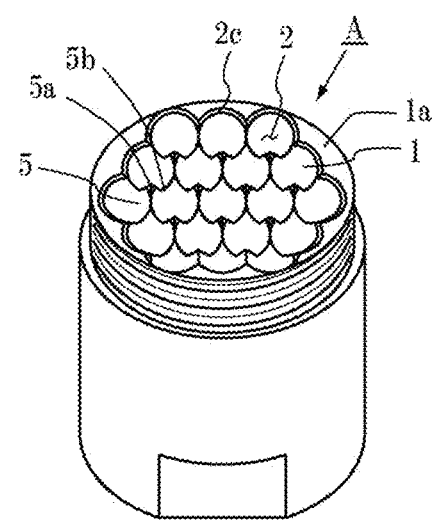
FIG. 10 is a perspective view of the inlet side of a nineteen-tube nozzle of the present invention.

FIG. 10 shows the case where nineteen nozzle tubes 1 are formed. In this case, the nozzle tubes 1 are arranged to form two concentric circles around one center tube 1 (hexagonal closest-packed structure), in which the inner circle consists of six nozzle tubes 1 and the outer circle consists of twelve nozzle tubes 1. In all the cases including the case of FIG. 9, the center-to-center distance between the adjacent nozzle tubes 1 around one nozzle tube 1 formed at the center of the front surface 1a is equal. In other words, in the case of three, seven, or nineteen nozzle tubes 1, the nozzle tubes 1 are respectively formed at the vertices of a set of equilateral triangles.

The nozzle tubes 1 are spaced apart by a distance such that the adjacent inlet-side opening sections 2 overlap each other. With this arrangement, a wall 5 of the overlapping portion 6 of the inlet-side opening sections 2 is cut in a U shape and forms a knife-edge ridge, and an uncut portion 5a between the adjacent U-shaped cut portions 5b forms a sword-like pointed tip. When the nozzle tubes 1 are spaced apart by a distance such that the adjacent inlet-side opening sections 2 overlap each other, the concave hemispherical surface 1a, except for the outer peripheral portion thereof, consists of the inlet openings of the nozzle tubes 1, the front knife edges of the U-shaped cut walls 5, and the sword-like pointed uncut portions 5a. The outer peripheral portion of the concave hemispherical surface 1a is also connected continuously and smoothly to the inlet section 2c having an arc-shaped cross section, as a portion of the inner peripheral surface of the inlet-side opening section 2.

Next, the behavior of the seawater R passing through the nozzle tube 1 is described. The seawater R drawn through the primary filter 41 using the water feed pump P4 is delivered to the inlet opening of the multi-tube nozzle A. When the seawater R thus reaches the inlet opening of the multi-tube nozzle A, it is divided into separate streams, which flow into a plurality of nozzle tubes 1. In order to minimize the pressure drop, it is important to prevent vortices from being formed when the seawater flows into the tubes 1.

The front surface 1a of the multi-tube nozzle A has a concave hemispherical shape as described above, and the most of the surface 1a consists of the inlet-side opening sections 2, the U-shaped cut portions 5b with knife edges, and the sward-like pointed uncut portions 5a formed at the ends of the U-shaped cut portions 5b. Therefore, when the seawater R reaches the front surface 1a, it is divided into separate streams along the sword-like pointed uncut portions 5a and the walls of the U-shaped cut portions 5b to form laminar flows, which flow smoothly into the following inlet-side opening sections 2 without forming vortices around the inlet-side opening sections 2.

Since the peripheral portion as the remaining portion of the front surface 1a also forms a smoothly curved surface connected to the inlet section 2c, the seawater R in the form of a laminar flow flows into the nearest nozzle tube 1 without forming a vortex.

As a result, on the inlet side, the seawater R flows into the nozzle tubes 1 at a pressure corresponding to the inlet-side pressure with little pressure drop. In addition, since the inlet-side opening section 2 of the nozzle tube 1 is gradually tapered toward the throat section 3, the flow rate increases as the cross-sectional area decreases. Since the inlet-side opening section 2 has the half vertex angle $\alpha$ as mentioned above, the loss caused by the reduced diameter of the nozzle is minimized.

The flow rate is highest at the throat section 3, and in the outlet-side opening section 4, the flow rate decreases as the cross-sectional area increases gradually. At the same time, however, the pressure decreases rapidly and gas dissolved in the seawater R is released and causes numerous nano-bubbles 8 to form in a high-speed discharge water flow (also referred to as a rectification core layer) 4a flowing in the outlet-side opening section 4. When the flow rate in the outlet-side opening section 4 is high, the high-speed discharge water flow 4a further extends upward from the outlet-side opening section 4 and flows in the water. Consequently, a mixed area containing the high-speed discharge water flow 4a and vortices U formed outside the water flow 4a is formed.

Since this outlet-side opening section 4 also has the half vertex angle $\beta$ as described above, the loss caused by the increased diameter of the nozzle is minimized Therefore, when compared between the nozzle tube 1 of the present invention and a conventional nozzle with slit openings (or a venturi tube), if the water pressures on the inlet side are equal, the rate of decrease in the flow rate of the high-speed discharge water flow 4a from the nozzle tube 1 of the present invention is much lower than that in the flow rate of water discharged from the conventional nozzle, which suffers a significant decrease in the flow rate at the outlet, and thus the amount of nano-bubbles 8 formed in the high-speed discharge water flow 4a in the nozzle of the present invention is much larger than (about twice) that in the conventional nozzle. This means that since the seawater R that has passed through the nozzle tube 1 of the present invention is an uncompressed fluid, its pressure drop is minimized and thus nano-bubbles 8 can be formed (cavitation can be caused to occur) effectively.

In the high-speed discharge water flow 4a, numerous nano-bubbles 8 (ultrafine babbles of about 50 μm or less: when bubbles of 50 μm or less are compressed by the force of ions at the gas-liquid interface, the ionic concentration at the gas-liquid interface increases and the internal pressure and temperature increase, and as a result implosion occurs. When numerous nano-bubbles 8 implode one after another, intense turbulence and high heat are applied to the surrounding water and each of the imploding nano-bubbles 8 generates a high-pressure shock wave in one direction) implode one after another and each emits a high-pressure, unidirectional shock wave to the surrounding water.

Figure 14:
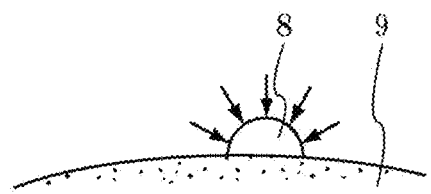
FIG. 14 is a conceptual diagram illustrating a state in which a nano-bubble is attached to a harmful aquatic organism.
Figure 15:
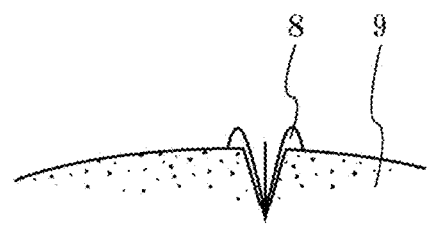
FIG. 15 is a conceptual diagram illustrating a state in which the nano-bubble implodes and damages the harmful aquatic organism.
Figure 16:
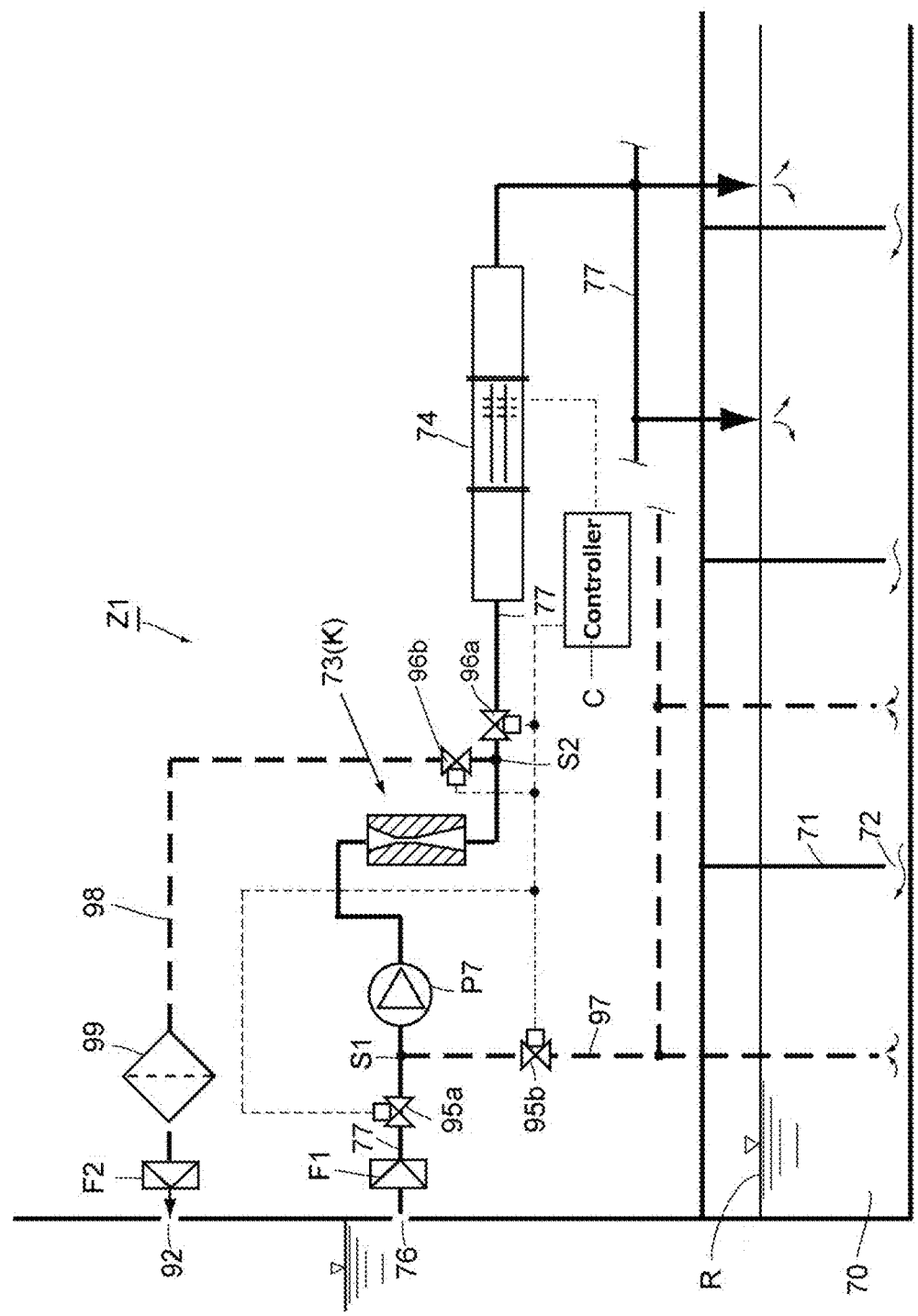
FIG. 16 shows a piping system of a fourth embodiment (for ballast water) including the nozzle of the present invention.
Figure 17:
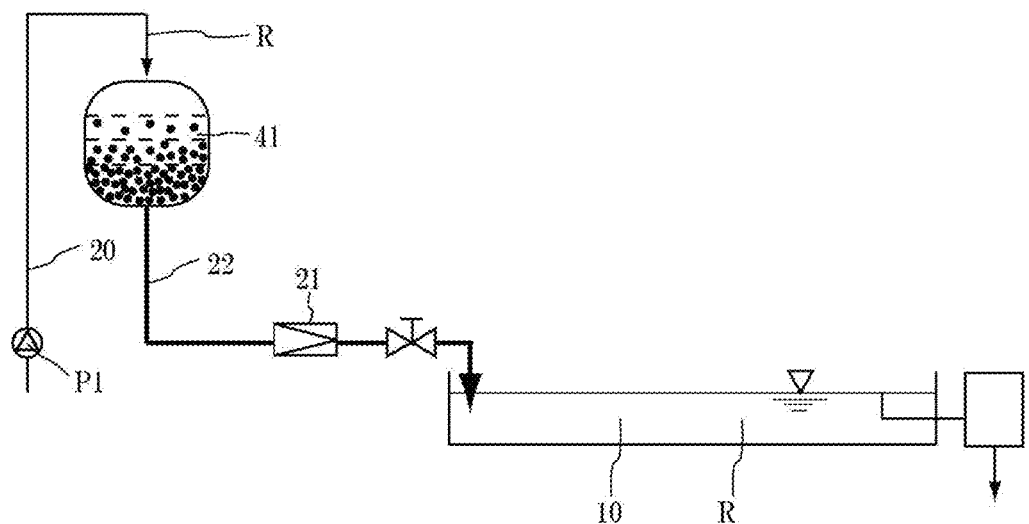
FIG. 17 is a schematic diagram of a conventional flow-through aquaculture system.
Figure 18:
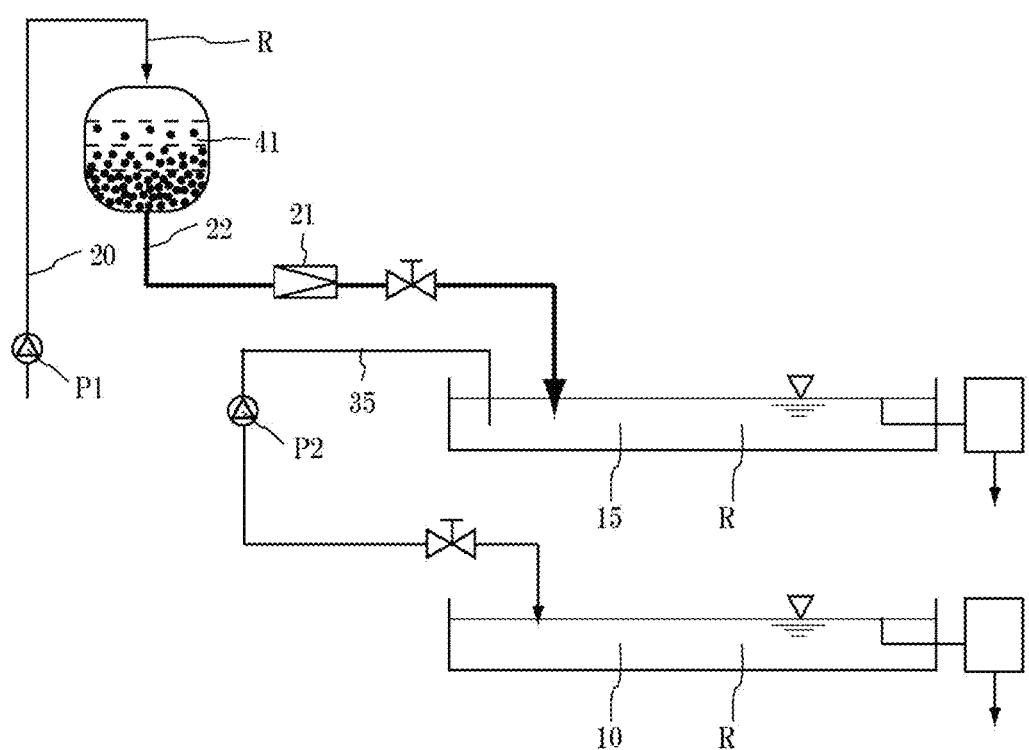
FIG. 18 is a schematic diagram of another conventional flow-through aquaculture system including a pretreatment tank.
Figure 19:
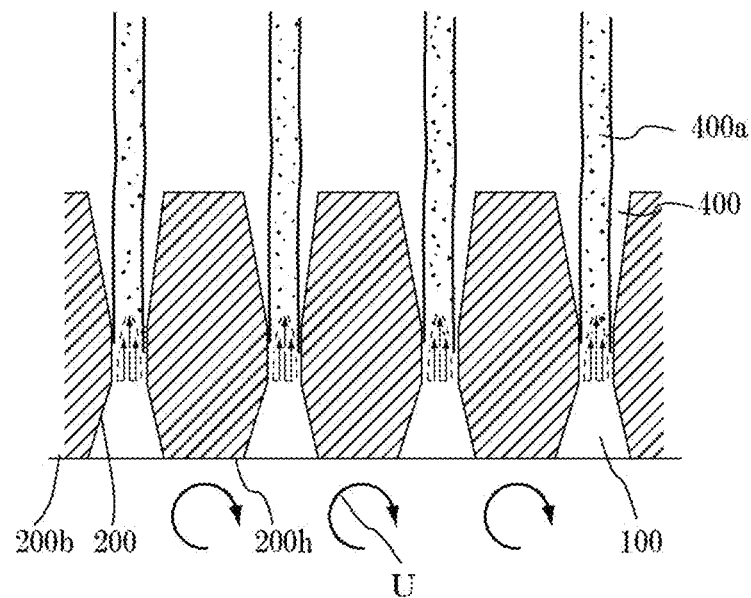
FIG. 19(a) shows a partial cross-sectional view of a conventional multi-tube nozzle in which the flow rate is not increased, and (b) shows a front view of the nozzle.
Figure 19:
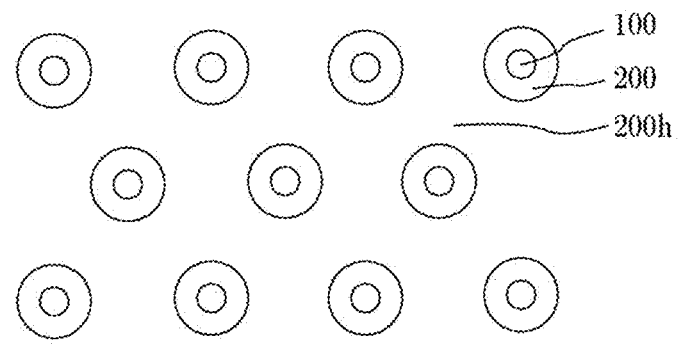

This unidirectional high-pressure shock wave directly hits aquatic organisms 9 which are floating in the surrounding water or to which nano-bubbles 8 are attached. For example, aquatic arthropods such as brine shrimps are destroyed, and even shells of bivalve larvae are partially destroyed and fatally damaged (see FIGS. 14 and 15). It should be noted that harmful aquatic organisms 9 such as copepods lose their fertility if even a small portion thereof is physically damaged, and their population steadily decreases over time.

Figure 5:
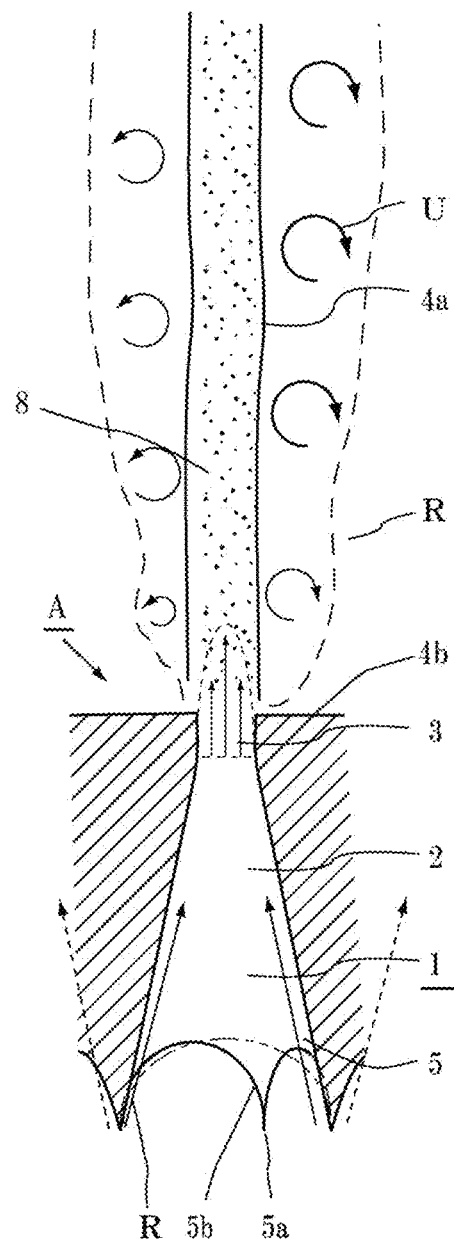
FIG. 5 is an enlarged longitudinal cross-sectional view of another multi-tube nozzle of the present invention.

FIG. 5 shows another example of the nozzle tube 1 without an outlet-side opening section 4. In the nozzle tube 1 with an outlet-side opening section 4, less pressure drop occurs. Even in this example of the nozzle tube 1, a large amount of nano-bubbles 8 are generated in a high-speed discharge water flow 4a from the outlet of the throat section 3 in the same manner as described above. In this nozzle tube 1 without an outlet-side opening section 4, the high-speed discharge water flow 4a from the throat section 3 extends longer and expands more rapidly than in the nozzle tube 1 with an outlet-side opening section 4, and thus causes more intense cavitation to occur. As a result, the inner surface of the pipe 22 on the outlet side of the nozzle tube 1 may be damaged in some cases, although there is little difference in the effect of eradicating aquatic organisms 9.

Next, the piping system of FIG. 1 is described. Since it is common practice in an aquaculture farm to rear two or more different types of aquaculture species, many culture tanks 10 are placed in parallel as described above, and each of them is fed with water from the water feed pipe 22 through the branch pipe 22a. The intake conduit 30 is provided in the sea, as described above, to constantly take the seawater R thereinto after removing some contaminants, and the resulting seawater R is pumped up through a water intake pipe or a water intake port by a water pumping pump P1 mounted adjacent to the intake conduit 30.

The water pumping pump P1 supplies the seawater R thus pumped up through the water pumping pipe 20 to a sand filter as the primary filter 41. In the primary filter 41, fine contaminants in the seawater R is removed through the filter layers therein, and the normal seawater R is delivered to the water feed pipe 22.

The water feed pipe 22 is provided with a water feed upper on/off valve 42a and a water feed lower on/off valve 42b, and these valves are opened when the water is fed. Since the shortcut pipe 23 must be closed during the water feed, the circulation on/off valve 32 is closed. Since a fixed amount of fresh seawater R is constantly fed to each culture tank 10 under normal conditions, the water tank on/off valve 52 is usually opened.

When the water feed pump P4 is started, the seawater R filtered through the primary filter 41 is drawn and flows through the multi-tube nozzle A of the pipe-embedded eradication unit K, in which most (80% to 90% or more) of the harmful aquatic organisms 9 in the seawater R are physically destroyed or damaged.

When the seawater R reaches the branch pipe 22a, it is finally filtered through the secondary filter 21 and fed to each culture tank 10. Therefore, the seawater R is contaminated with a slight amount of surviving harmful aquatic organisms 9 and cysts that have been neither damaged nor removed by filtration through the secondary filter 21, and each culture tank 10 is also contaminated when the seawater R is fed to the tank 10. The mechanism of killing and damaging harmful aquatic organisms 9 by means of the multi-tube nozzle A built in the pipe-embedded eradication unit K has been described above.

The same amount of rearing seawater R as the fed seawater R is discharged from the water discharge section 12, and thus the water quality and water level in each culture tank 10 are maintained constant.

In the early stage of aquaculture, each culture tank 10 is filled with aquaculture seawater R, in which mother shells lay eggs and the eggs hatch into larvae, and thus numerous larvae are floating near the water surface. These numerous larvae grow by feeding and excretion. Harmful aquatic organisms 9 and cysts are also present in the culture seawater R, and the surviving harmful aquatic organisms 9 in the culture seawater R and harmful aquatic organisms 9 hatched from the surviving cysts therein are propagated by feeding and by eating the larvae. However, the amount of these harmful aquatic organisms 9 is very small as described above and does not affect the growth of the larvae at this stage. In this manner, the larvae are reared until they grow to a size suitable for eating.

It should be noted that since fresh seawater R containing only a small number of surviving harmful aquatic organisms 9 is constantly fed to each culture tank 10 after most of harmful aquatic organisms 9 are destroyed, it is less likely that bloom of the harmful aquatic organisms 9 occurs in the process of rearing the larvae to damage them, but another configuration as shown in FIG. 2 is also proposed and described next. It is also possible to prevent this situation by providing an additional eradication device B of FIG. 3. This additional eradication device B is described with reference to FIG. 3.

It should be noted that, for example, if the seawater R must be fed urgently due to the failure of the water feed pump P4 in the configuration of FIG. 1, the water feed upper on/off valve 42a and the water feed lower on/off valve 42b are closed, the circulation on/off valve 32 of the shortcut pipe 23 is opened, and the seawater R that has undergone only filtration is fed to the culture tanks 10. This also applies to the configuration of FIG. 2.

Next, the configuration of FIG. 2 is described. In FIG. 2, the same numerical references as in FIG. 1 are used, and the description of FIG. 1 is incorporated herein by reference. In FIG. 1, fresh seawater R is fed to each culture tank 10 through the water feed pipe 22, but it is likely that the surviving cysts in the seawater R that has undergone eradication treatment adhere to the inner surface of the water feed pipe 22 located downstream of the pipe-embedded eradication unit K, hatch there in the course of time, and contaminate the seawater R to be fed. In this case, the contaminated seawater R may pass through the secondary filter 21, flow directly into each culture tank 10, and cause damage. The aquaculture facility Z of FIG. 2 is characterized in that a return pipe 60 is provided to connect the end Q4 of the water feed pipe 22 and a junction Q3 with a portion of the water feed pipe 22 located on the inlet side of the water feed upper on/off valve 42a.

The filtered seawater R drawn from the primary filter 41 is subjected to eradication treatment, and a fixed amount of the treated seawater R is constantly fed to each culture tank 10 through the branch pipe 22a, as in the configuration of FIG. 1. The residual amount of the treated seawater R is returned from the end Q4 to the junction Q3 through the return pipe 60 and mixed into the filtered seawater R drawn from the primary filter 41.

Since the harmful aquatic organisms 9 in the residual amount of the treated seawater R have undergone at least one eradication treatment, the amount of such harmful aquatic organisms 9 is far less than that in the filtered seawater R, even if cysts hatch during the return of the treated seawater R. Therefore, the number of cysts in the water feed pipe 22 located downstream of the pipe-embedded eradication unit K decreases accordingly.

When this mixed seawater R is subjected to the eradication treatment, the amount of the harmful aquatic organisms 9 in the treated seawater R that has undergone the eradication treatment decreases significantly, as described above (80% to 90% or more of the organisms 9 are eradicated). At the same time, the amount of cysts adhering to the inner surface of the water feed pipe 22 located downstream of the pipe-embedded eradication unit K also decreases as the cysts hatch.

By repeating this cycle, the water feed pipe 22 located downstream of the pipe-embedded eradication unit K is cleaned, and unexpected damage caused by the cysts adhering to this portion of the pipe 22 can be avoided.

It should be noted that it is possible to place the additional eradication device B of FIG. 3 not only in the configuration of FIG. 1 but also in the configuration of FIG. 2.

Next, the additional eradication device B shown in FIG. 3 is described. In FIG. 3, the same numerical references as in FIG. 1 are used, and the description of FIG. 1 is incorporated herein by reference. In the configuration of FIG. 3, the water feed pipe 22 is not provided with a pipe-embedded eradication unit K, and the seawater R filtered through the secondary filter 21 is fed directly to each culture tank 10 through the branch pipe 22a. Therefore, untreated harmful aquatic organisms 9 and cysts are put into the culture tank 10.

The additional eradication device B includes a circulation pump P3 for drawing rearing seawater R from the culture tank 10, a circulation pipe 40 provided with the circulation pump P3, for circulating the culture seawater R in the culture tank 10 using the circulation pump P3, and a pipe-embedded eradication unit K placed in a vertical portion of the circulation pipe 40 on the outlet side of the circulation pump P3. In addition, a flexible pipe 40a is placed, if necessary, on the inlet side of the circulation pump P3 so that the flexible pipe 40a is located next to the water feed side of the circulation pipe 40. A circulation on/off valve 42c is placed on the water drawing side of the circulation pipe 40, and the flexible pipe 40a is provided with a pipe on/off valve 42d.

The additional eradication device B includes the above-mentioned components in a frame (not shown), and can be provided in each culture tank 10.

When the additional eradication device B is provided in the culture tank 10, the outlet and inlet of the circulation pipe 40 are put into the rearing seawater R, the circulation pipe 40 is filled with the rearing seawater R, and then the circulation pump P3 is started. Thereby, the rearing seawater R is drawn from the inlet of the circulation pipe 40, subjected to eradication treatment through the pipe-embedded eradication unit K, and discharged from the outlet of the circulation pipe 40. By repeating this cycle, the harmful aquatic organisms 9 in the rearing seawater R in the culture tank 10 can be subjected to eradication treatment step by step.

The rearing seawater R within a large culture tank 10 has a region with a high concentration of harmful aquatic organisms 9. In such a case, the circulation on/off valve 42c is closed, the pipe on/off valve 42d is opened, and the flexible pipe 40a made of a soft, flexible hose is moved to and put into the region with a high concentration of harmful aquatic organisms 9 so as to draw the rearing seawater R containing the harmful aquatic organisms 9 in the region and feed it into the pipe-embedded eradication unit K. Thus, the water R in the region with a particularly high concentration of harmful aquatic organisms 9 in the culture tank 10 can be selectively drawn using the flexible pipe 40a and subjected to eradication treatment.

Unlike the aquaculture facility Z of FIG. 3, the aquaculture facilities Z of FIGS. 1 and 2 require no special care for feed water because only fresh treated seawater R is fed in one direction to the culture tank 10 without drawing the rearing seawater R from the culture tank 10. In contrast, the additional eradication device B of FIG. 3, in which the rearing seawater R is drawn from the culture tank 10, requires measures to prevent larvae floating on the surface of the rearing seawater R in the early stage of the aquaculture from being drawn together with the rearing seawater R.

The larvae in the culture tank 10 grow to juveniles over time. At this stage of growth, the juveniles are attached and fixed to the inner wall of the culture tank 10 or the inner surface of a culture cage suspended in the culture tank 10, or to algae as feeds. At this stage, the juveniles are not drawn into the additional eradication device B even if the rearing seawater R is drawn. Therefore, it is also possible to use the aquaculture facility Z of FIG. 1 or FIG. 2 to rear the larvae in the early stage of aquaculture, and when the larvae grow to juveniles, use the additional eradication device B of FIG. 3 to additionally perform eradication treatment of harmful aquatic organisms 9 in the culture tank 10.

It should be noted that it is also possible to control the start and stop operations of the pumps and the opening and closing operations of the valves under commands from a controller C on the best timing.

The configuration including one pipe-embedded eradication unit K has been described above, but two or more pipe-embedded eradication units K may be used and arranged in series or in parallel.

In the case of series arrangement, pipe-embedded eradication units K1 to Kn ("n" is an integer of 2 or more, and the same applies hereinafter) are arranged at regular intervals in the water feed pipe 22, as shown in FIG. 1(b). FIG. 1(b) shows the case where water feed pumps P41 to P4n are provided respectively for the pipe-embedded eradication units K1 to Kn. It is also possible to use a large capacity water feed pump P4 instead of the n water feed pumps P41 to P4n. This one-to-one arrangement of the water feed pumps P41 to P4n as shown in FIG. 1(b) allows miniaturization of pumps.

In the case of series arrangement, as much as at least 70% of harmful aquatic organisms are destroyed or damaged in the first pipe-embedded eradication unit K1, and a similar proportion of the harmful aquatic organisms that have survived undestroyed or undamaged in the first unit K1 are destroyed or damaged in the following second pipe-embedded eradication unit (not shown). By repeating this treatment n times, only a small number of harmful aquatic organisms that have survived undestroyed or undamaged in these pipe-embedded eradication units K1 to Kn remain. In other words, this series arrangement can achieve a very high eradication rate. It should be noted that since the harmful aquatic organisms 9 lose their fertility even if they are only damaged, not only dead individuals but also damaged individuals are counted as dead ones to calculate the eradication rate.

In the case of parallel arrangement, as shown in FIG. 1(c), the water feed pipe 22 is divided into n branch pipes, n pipe-embedded eradication units K1 to Kn ("n" is an integer of 2 or more, and the same applies hereinafter) are respectively mounted in the n branch pipes. The water feed upper on/off valves 42a1 to 42an are respectively provided on the inlet side of the branched water feed pipes 221 to 22n. The pipes extending from the outlets of the pipe-embedded eradication units K1 to Kn are combined into one pipe on their outlet side, and the water feed lower on/off valve 42b is connected to this pipe.

The eradication rate cannot be increased in the case of parallel arrangement, but the flow rate can be controlled during rearing. For example, when 1000 tons of water is required to be supplied to X tanks 10, if m tanks 10 are not used and X-m tanks 10 needs to be fed with water, the corresponding number of water feed upper on/off valves among the valves 42a1 to 42an of the n branch lines 221 to 22n are closed to reduce the amount of water to be fed. In the case of parallel arrangement, a backup line can replace any faulty line in this arrangement.

It should be noted that the series arrangement and parallel arrangement have been separately described above, but the present invention is not limited to these arrangements, of course. A plurality of series-connected pipe-embedded eradication units K1 to Kn may be provided in each of the parallel lines 221 to 22n to increase the eradication rate of each of the lines 221 to 22n.

The above-described series arrangement or parallel arrangement can be applied not only to the piping system of FIG. 1 but also to the piping systems of FIG. 2 and FIG. 3. In the configurations shown in FIGS. 1(b) and (c), water feed pumps P41 to P4n are provided respectively in the pipe-embedded eradication units K1 to Kn, but a large capacity water feed pump P4 can replace these n individual water feed pumps P41 to P4n. The one-to-one arrangement of these water feed pumps P41 to P4n as shown in FIGS. 1(b) and (c) allows miniaturization of pumps.

Furthermore, pairs of the water feed pumps P41 to P4n and the corresponding pipe-embedded eradication units K1 to Kn may each be installed in one pipe provided with a flange plate 7 for connection to prepare unit pipes H1 to Hn. In this case, the number of the unit pipes H1 to Hn can be changed depending on the actual situation by attaching or detaching any of the unit pipes H1 to Hn to or from a portion of the water feed pipe 22. It should be noted that after some unit pipes H1 to Hn are removed from the water feed pipe 22, simple flange pipes that are connected at their flanges replace the removed unit pipes.

EXAMPLES

Test results for the inner diameter of the throat section of the nozzle tube are shown below. Multi-tube nozzles A each having a diameter of 50 mm were used. The number of nozzle tubes formed in each of the multi-tube nozzle A was determined so that the following differential pressures were obtained.

Test conditions: Each of the multi-tube nozzles was mounted in the water feed pipe with the nozzle inlet facing down so as to pump water upward using a water feed pump. The inlet-side pressure of the nozzle tube was 0.50 MP or 0.25 MP, and the outlet-side pressure thereof was 0.05 MP.

Therefore, the differential pressures are 0.45 MP and 0.20 MP, respectively, in "(a) and (b) in the table below". The inner diameters of the throat sections of the multi-tube nozzles thus prepared and the eradication rates of these nozzles are shown below.

It should be noted that the eradication rate was calculated by counting the number of aquatic organisms sampled from pre-test (control) seawater and the number of damaged organisms and the number of undamaged (healthy) organisms sampled from the post-test seawater. Therefore, the post-test sample included a considerable number of organisms that were completely destroyed without a trace, and such destroyed organisms could not be counted.

| Inner diameter | Eradication rate (a) (%) | Eradication rate (b) (%) |
|---|---|---|
| 3.0 mm | 60 | 30 |
| 2.5 mm | 70 | 68 |

-continued

| Inner diameter | Eradication rate (a) (%) | Eradication rate (b) (%) | |
|---|---|---|---|
| 2.2 mm | 80 | 68 | |
| 2.0 mm | 88 | 63 | |
| 1.8 mm | 90 | 67 | |
| 1.5 mm | 90 | 69 | |
| 1.0 mm | 70 | 58 | (Notes) |
| 0.5 mm | 60 | 56 | (Notes) |

(Notes)
When the inner diameter was 1.0 mm (0.5 mm), the eradication rates were 70% (60%) and 58% (56%), respectively, because a considerable number of organisms were completely destroyed without a trace and such destroyed organisms could not be visualized (counted), that is, the counted number of surviving organisms relative to the counted number of killed or damaged organisms was larger than the actual number. Therefore, it is estimated that the actual eradication rate was nearly 100% when the inner diameter was 1.0 mm (0.5 mm). However, the inner diameter of 1 mm is too small to increase the flow rate even if the number of nozzle tubes is increased (in other words, the nozzle tubes 1 cannot be arranged very close to one another due to their shape, and the number of the nozzle tubes is limited). An inner diameter of less than 0.5 mm is not practical because it causes too much pressure drop.

When the differential pressure in the case of the inner diameter (a) is reduced to almost half the differential pressure in the case of the inner diameter (b), the eradication rate is also reduced accordingly (when the inner diameter is 3 mm, the eradication rate drops significantly, but when the inner diameter is 2.5 mm or less, the drop rate is about 10%), as shown in the above table. In order to achieve an eradication rate of about 70%, the inner diameter is in a range of 1 mm to 3 mm (more preferably 2 mm±0.5 mm). It should be noted that the inlet-side pressure is assumed to be 0.5 MP, although it depends on the performance of a water feed pump used.

Next, the case where the multi-tube nozzle A of the present invention is used for charging and discharging ballast water R (a fourth embodiment) is described. Since the operation and effects of the multi-tube nozzle A are basically the same as those described in the above case where it is used in the aquaculture facility Z or the like, the description of the aquaculture facility Z is incorporated herein by reference.

A ballast tank 70 is a tank for storing ballast water R and is provided on the bottom of a ship from the bow toward the stern. The interior of the ballast tank 70 is divided into compartments by partitions 71 arranged in a matrix and each having a number of communication holes 72, and the amount of the ballast water R in the ballast tank 70 is controlled by a water discharge system (not shown) so as to keep the ship steady.

A water intake port 76 and a water discharge port 92 are formed on the side of the ship. A water intake pipe 77 connects the water intake port 76 and the ballast tank 70. An intake water filtering device F1 is placed in or adjacent to the water intake port 76 of the water intake pipe 77. In addition, a high-pressure pumping pump P7 (which is a pump for use in ships, and thus can feed water at a higher pressure than the water pumping pump P1 although its operation is the same as the water pumping pump P1), a ballast water treatment device 73, and a disinfectant adding device 74 are arranged in this order from the intake water filtering device F1. A water pumping pipe 97 is connected to the water intake pipe 77 at a pipe connection point S1 between the intake water filtering device F1 and the high-pressure pumping pump P7 so as to pump the ballast water R in the ballast tank 70 through the water pumping pipe 97.

The ballast water treatment device 73 is provided downstream of the high-pressure pumping pump P7, the disinfectant adding device 74 is provided downstream of the ballast water treatment device 73, and the water intake pipe 77 extending from the disinfectant adding device 74 is connected to the ballast tank 70.

A water discharge pipe 98 is provided at a pipe connection point S2 between the ballast water treatment device 73 and the disinfectant adding device 74 and is connected to the water discharge port 92. A discharge water filtering device F2 is placed in or adjacent to the water discharge port 92, and a disinfectant removing unit 99 is placed in the water discharge pipe 98 at the upstream of the discharge water filtering device F2. A material such as activated carbon is suitably used as a material to be filled in the disinfectant removing unit 99 because the ballast water can be discharged after activated carbon adsorbs the residual disinfectant remaining even after the decomposition treatment in the ballast water treatment device 73.

It should be noted that an on/off valve 95a is placed between the intake water filtering device F1 and the pipe connection point S1 (corresponding to the connection point between the water intake pipe 77 and the water pumping pipe 97), and an on/off valve 95b paired with the above on/off valve 95a is provided in the water pumping pipe 97. Furthermore, an on/off valve 96a is placed between the pipe connection point S2 (corresponding to the connection point between the water discharge pipe 98 and the water intake pipe 77) and the disinfectant adding device 74, and an on/off valve 96b paired with the above on/off valve 96a is provided between the pipe connection point S2 and the disinfectant removing unit 99.

The pair of on/off valves 95a and 95b operate in conjunction with each other to perform the same operation as a three-way electromagnetic changeover valve (not shown) provided at the pipe connection point S1, while the pair of on/off valves 96a and 96b operate in conjunction with each other to perform the same operation as a three-way electromagnetic changeover valve provided at the pipe connection point S2.

The intake water filtering device F1 includes a coarse filtering part and a fine filtering part. The coarse filtering part filters out contaminants such as large and small debris and large aquatic organisms such as jelly fish and seaweed in the seawater R taken from the water intake port 76 on the side of the ship. The fine filtering part provided downstream of the coarse filtering part captures a certain number of phytoplankton and zooplankton in the seawater R. The discharge water filtering device F2 filters out contaminants and others in the ballast water R pumped up from the ballast tank 70.

The above-mentioned on/off valves 95a, 95b, 96a, 96b, the high-pressure pumping pump P7, the disinfectant adding device 74, etc. are controlled by the controller C.

The ballast water treatment device 73 provided downstream of the high-pressure pumping pump P7 includes one or a plurality of pipe-embedded eradication units K. A plurality of pipe-embedded eradication units K are arranged in series as shown in FIG. 1(b) or in parallel as shown in FIG. 1(c). In this case, a high-pressure pumping pump (not shown) can replace the water feed pumps P41 to P4n, as in the case described above. As for the structure, operation, and effects (decomposition of a disinfectant component (ClO$^-$) by collapse of numerous micro-bubbles and destruction and killing of aquatic organisms 9) of the pipe-embedded eradication unit K, the description with reference to FIG. 6 is incorporated herein by reference.

The disinfectant adding device 74 is a device for adding a disinfectant in an amount enough to eradicate the aquatic organisms that have barely managed to survive (they may have already been eradicated) after passing through a cascade field (a field where successive implosions of a large number of micro-bubbles cause intense shock pressure) of the ballast water treatment device 73, that is, a device for adding an appropriate amount of sodium hypochlorite, or an electrolysis device for producing sodium hypochlorite through electrolysis of the ballast water R. In the electrolysis device, chlorine is produced at the anode and the produced chlorine diffuses into the ballast water R. It should be noted that in this device, the anode and the cathode are separated by a separating membrane not shown.

In the fourth embodiment configured as described above, the seawater R is charged into the ballast tank 70 to prevent a ship from being lifted more than necessary as cargo is unloaded at an unloading port and the weight of the ship decreases. In this case, the on/off valves 95b and 96b are closed and the on/off valves 95a and 96a are opened to allow the seawater R to flow only through the water intake pipe 77. Then, the seawater is taken into the ship through the water intake port 76 by operating the high-pressure pumping pump P7. As the seawater is taken into the ship, various sizes of contaminants, and relatively large aquatic organisms, phytoplankton, zooplankton, etc. in the seawater are removed by the filtering device F1, as described above. These captured aquatic organisms, etc. are returned to the sea at the unloading port by backwashing.

At the next port of call, cargo is loaded. Since the ship goes down under the weight of the loaded cargo, the ballast water R in an amount corresponding to the weight of the loaded cargo must be discharged at the port of call. In order to discharge the ballast water R, the on/off valves 95a and 96a are closed and the on/off valves 95b and 96b are opened, and the ballast water R is pumped up by operating the high-pressure pumping pump P7 to allow the entire ballast water R to flow through the ballast water treatment device 73. Then, in the disinfectant removing unit 99 immediately upstream of the discharge-side filtering device F2, the ballast water R to be discharged is subjected to activated carbon adsorption treatment to remove residual sodium hypochlorite. The ballast water R thus treated is filtered through the discharge-side filtering device F2 and then discharged into the sea. Since the ballast water R is subjected to the treatment in the ballast water treatment device 73, the resulting ballast water R to be discharged can have the ballast water treatment effects as described above (significant reduction in the use of activated carbon for adsorption of residual sodium hypochlorite and damaging a very small number of surviving aquatic organisms, etc. in the ballast water R).

REFERENCE SIGNS LIST

A: Multi-tube nozzle (for use in eradicating harmful aquatic organisms)
B: Additional eradication device
C: Controller
F1: Intake water filtering device
F2: Discharge water filtering device
H1 to Hn: Unit pipes
K, K1 to Kn: Pipe-embedded eradication units
P1: Water pumping pump
P2: Transfer pump
P3: Circulation pump
P4, P41 to P4n: Water feed pumps
P7: High-pressure pumping pump
Q1: Inlet-side connection point
Q2: Outlet-side connection point
Q3: Junction Q4: End of water feed pipe
R: Water (mixed water, treated water, rearing seawater, pumped water, seawater, river water, brackish water, feed water, culture water, filtered water, rearing seawater, and ballast water)
S1, S2: Pipe connection points
U: Vortex
α, β: Half vertex angles
Z: Aquaculture facility
Z1: Ballast water treatment facility
1: Nozzle tube
1a: Concave hemispherical surface (front surface)
2: Inlet-side opening section
2a: Circle of inlet opening edge
2c: Inlet section (connecting section)
3: Throat section
4: Outlet-side opening section
4a: High-speed discharge water flow
4b: Outlet-side end
5: Wall
5a: Uncut portion
5b: U-shaped cut portion
6: Overlapping portion
7: Flange plate
7a: Mounting hole
7b: O ring
7c: Closing stopper
8: Nano-bubble
9: Harmful aquatic organism (copepod)
10: Culture tank
12: Water discharge section
15: Pretreatment tank
20: Water pumping pipe
21: Secondary filter (high-efficiency filter)
22: Pipe (water feed pipe)
22a: Branch pipe
221 to 22n: Branched water feed pipes (lines)
23: Shortcut pipe
30: Intake conduit
32: Circulation on/off valve
35: Transfer pipe
40: Pipe (circulation pipe)
40a: Flexible pipe
41: Primary filter
42a: Water feed upper on/off valve
42a1 to 42an: Water feed upper on/off valves for branched water feed pipes
42b: Water feed lower on/off valve
42c: Circulation on/off valve
42d: Pipe on/off valve
52: Water tank on/off valve
60: Return pipe
70: Ballast tank
71: Partition
72: Communication hole
73: Ballast water treatment device
74: Disinfectant adding device
76: Water intake port
77: Water intake pipe
92: Water discharge port
95a, 95b, 96a, 96b: On/off valves
97: Water pumping pipe
98: Water discharge pipe
99: Disinfectant removing unit
100: Nozzle tube
200: Inlet-side opening section
200b: Inlet-side surface
200h: Flat portion
400: Outlet-side opening section
400a: Discharge water flow

The invention claimed is:

1. A multi-tube nozzle for use in eradicating harmful aquatic organisms, comprising at least three nozzle tubes that are provided adjacent to each other, the nozzle tubes each comprising: an inlet-side opening section having an inner diameter that decreases from an inlet opening toward a throat section located in the middle of the tube; an outlet-side opening section having an inner diameter that increases from the throat section toward an outlet opening; and the throat section having a smallest inner diameter, wherein
the adjacent nozzle tubes are spaced apart by a distance such that the adjacent inlet-side opening sections overlap each other,
a wall of an overlapping portion of the inlet-side opening sections is cut in a U shape, and
an uncut portion between the adjacent U-shaped cut portions forms a sword-like pointed tip.

2. A multi-tube nozzle for use in eradicating harmful aquatic organisms, comprising at least three nozzle tubes that are provided adjacent to each other, the nozzle tubes each comprising: an inlet-side opening section having an inner diameter that decreases from an inlet opening toward a throat section; and the throat section having an outlet-side end that serves as an outlet opening, wherein
the adjacent nozzle tubes are spaced apart by a distance such that the adjacent inlet-side opening sections overlap each other,
a wall of an overlapping portion of the inlet-side opening sections is cut in a U shape, and
an uncut portion between the adjacent U-shaped cut portions forms a sword-like pointed tip.

3. The multi-tube nozzle for use in eradicating harmful aquatic organisms according to claim 1, wherein the throat section has an inner diameter of 0.5 mm to 3 mm.

* * * * *